May 26, 1953  B. RONAY  2,640,136
ELECTRODE FOR UNDERWATER CUTTING
Filed Jan. 30, 1947
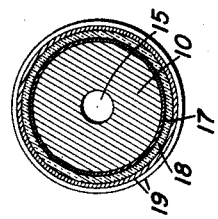
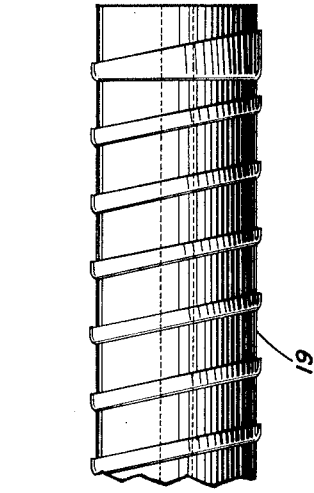
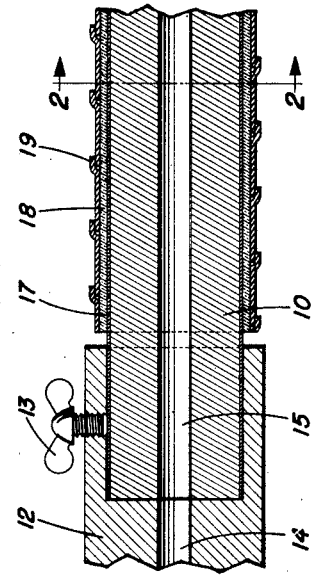
Inventor
BELA RONAY
By
Attorney Patented May 26, 1953

2,640,136

UNITED STATES PATENT OFFICE 2,640,136

ELECTRODE FOR UNDERWATER CUTTING

Bela Ronay, Annapolis, Md.

Application January 30, 1947, Serial No. 725,177

13 Claims. (Cl. 219—15)

(Granted under Title 35, U. S. Code (1952), sec. 266)

This invention relates to electric arc heating or cutting means and more particularly to a novel electrode for such means.

A common method of cutting metal under water involves the use of a metallic arc. Another method involves the use of oxygen, and is known as the oxy-arc or arc-oxygen method. In a simple form of oxy-arc cutting of steel, a tube of suitable size serves as one terminal of an electric power source and at the same time as the nozzle at the end of a hose connected to a source of oxygen. The target or the material to be cut is connected to the other terminal of the power source, which may be either a welding generator or welding transformer or any other source of electric power of the required capacity. Cutting is established by striking an electric arc between the target and the steel electrode tube. The heat of the arc quickly brings both the electrode tip and the anode spot of the target to incandescence, and then the oxygen valve is opened and the stream of oxygen travels through the arc without extinguishing it. The oxygen is impinged upon the target and it accelerates the cutting thereof by oxidizing it. The excess oxygen mechanically removes the burned metal by blowing it out of the cut. When the electrode tube is a steel tube of the required diameter its own mass is much smaller than that of the target. Therefore, it melts away quickly and requires frequent replacement. When the operation is under water such frequent replacement is a great hindrance to efficient performance.

Another type of electrode commonly used comprises a non-ferrous tube and contains a square core of cast iron. The combined bulk of these materials is considerably larger than that of the previously described steel tube, and in addition the high conductivity of the non-ferrous tube prevents it from being melted away as fast as the lighter steel tube. The flow of oxygen, however, as it issues from the orifices between the bore of the copper tube and the upper surface of the cast iron core is indirect and thereby results in an excessive consumption of oxygen over that of the steel tube for comparable volumes of metal removed.

It will be seen therefore, that the use of tubular steel electrodes necessitates frequent replacement, which, of course, reduces the effectiveness of this process. On the other hand, if a non-ferrous tube cast iron core electrode is used, the oxygen consumption is excessive.

One of the principal objects of the present invention is to provide a new and improved electrode.

Another object to provide an electrode that will be mechanically stronger than those of the prior art.

Another object is to provide an electrode that will not be consumed at a wasteful rate, but will permit operation for a reasonable length of time.

Another object is to reduce the number of electrode replacements during cutting operations under water.

Other objects will become apparent from a reading of the specification.

The invention will be more readily understood with reference to the accompanying drawings, in which:

Fig. 1 is a longitudinal view, partially in section, of the new and improved electrode and its supporting structure.

Fig. 2 is a transverse cross-section of the electrode taken along the line 2—2 of Fig. 1.

As shown in the drawings, the electrode 10 is shown fastened to the head 12 of a cutting apparatus by means of a clamping screw 13 or other similar means. The head 12 of the cutting apparatus is apertured axially to provide a passageway 14 for the oxygen that is required in the cutting operation. This passageway 14 is aligned with a similar passageway 15 in the electrode 10.

The electrode 10 is portrayed in the drawings as a cylinder of constant length, but it is obvious that the shape may vary to suit the particular purpose. Commonly, the electrode 10 will be six inches long and have an external diameter of ½ inch. The internal passageway 15 will be of the order of ⅛ inch in diameter.

The electrode 10 is constructed of a core of siliconized silicon-carbide or like ceramic material. Surrounding the outer surface of the ceramic core is a comparatively thin layer of metal, such as low carbon steel or Phosphor bronze. A preferred method of applying this coating 17 is by spraying, although it can be applied by electro-plating, casting, or other process. This coating reduces the liability of the core 10 to breakage. The metallic coating 17 also serves as a conductor of heat and electricity from the head 12 of the cutting torch, thereby decreasing thermal shock ruptures.

Surrounding the metal coating 17 is an additional concentric coating of spun glass 18. This glass coating serves as a slagging material and also as an insulator, thereby further reducing thermal shock ruptures. An additional external coating 19 comprises masking tape or Scotch tape to protect the electrode during handling and during use.

Since a portion of the electrode is clamped in the head 12 of the apparatus it is not considered necessary that the spun glass coating 18 or the external coating 19 extend the full length of the electrode. For this reason these coatings 18 and 19 cover only that portion of the core that is designed to remain outside the head 12 of the torch.

If considered desirable, the glass coating 18 and the tape 19 may be replaced by a single glass cloth sleeve saturated with suitable insulating materials such as plastic.

The silicon-carbide core may be strengthened considerably by being annealed at a temperature of about two thousand degrees Fahrenheit, thereby greatly reducing thermal expansion breakage.

In operation of the device, cutting is effected by establishing a confined arc between the target or work and the electrode 10. The heat of the arc quickly brings both the electrode and the target to incandescence, and then the oxygen valve is opened and the oxygen pours through the passageways 14 and 15 against the target. The role of the oxygen is two-fold, namely, a portion of the oxygen is utilized to combine chemically with the heated metal, and the excess oxygen blows out the resulting oxide. In underwater operations the oxy-arc method of cutting utilizes oxygen pressure that is considerably higher than in the oxy-acetylene cutting in air, in order to compensate for the static head of water above the work level. This pressure is of the order of 50 lbs. per square inch or higher. It has been found that in using a device fabricated in accordance with the principles of this invention the electrode is strong enough to withstand this pressure, whereas in the prior methods the electrode would rupture. Above all, as already indicated, the instant electrode volatilizes at a rate that is much slower than with the electrode previously encountered, thereby permitting operation at a substantially increased efficiency.

The invention described herein may be manufactured and used by or for the Government of the United States of America for governmental purposes without the payment of any royalties thereon or therefor.

What is claimed is:

1. An electrode for electrical arc cutting apparatus, comprising an elongated main body of siliconized silicon carbide, and a metallic sheath of appreciable thickness surrounding the main body of the electrode and closely interfitting therewith, the said sheath extending longitudinally of the electrode body for at least a substantial part of the length of the said body, whereby an electrical connecting means attached to the electrode substantially at one end thereof makes contact with the said metal sheath, the said sheath constituting a low resistance path for the current from the point of attachment of the electrical connecting means to at least substantially the working end of the electrode.

2. An electrode for electrical arc cutting apparatus, comprising an elongated main body of siliconized silicon carbide, the said main body having an aperture longitudinally therethrough for the passage of gas, a metallic sheath of appreciable thickness on the said main body covering and tightly embracing the body for at least a substantial portion of its length, the sheath being so positioned as to allow direct electrical contact with the electrical connecting means for the electrode, the said sheath constituting a low resistance path for the current from the electrical connecting means from the electrode to a point substantially at the working end of the electrode where the arc is formed.

3. An electrode comprising a core of silicon carbide, a metallic coating surrounding the said core, a glass fabric coating surrounding the said metallic coating, and a protective coating surrounding the glass fabric coating.

4. An electrode adapted for use in under-water electrical arc heating apparatus, said electrode comprising a main body of siliconized silicon-carbide and a continuous protective sheath of strong material having a much lower electrical resistance than the main body attached to the main body of the electrode and extending longitudinally thereof for substantially the full length thereof, said sheath being of an appreciable thickness and constituting a low resistance path for the current from the point of attachment of an electrical connecting means to at least substantially the working end of the electrode.

5. An electrode for electrical arc heating apparatus, said electrode comprising a main body of siliconized silicon carbide and a continuous sheath of strong material having a much lower electrical resistance than the main body closely interfitting with the main body of the electrode and extending longitudinally of the electrode body for at least a substantial part of the length thereof, said sheath being of appreciable thickness and constituting a low resistance path for the current from the point of attachment for an electrical connecting means to at least substantially the working end of the electrode.

6. An electrode for electrical arc heating apparatus, said electrode comprising a main body of siliconized silicon-carbide and a sheath of an appreciable thickness of strong material having a much lower electrical resistance than the main body attached to the main body of the electrode and tightly embracing the main body of the electrode throughout at least substantially all the length of the sheath, said sheath extending longitudinally of the electrode body for at least a substantial part of the length of said body and having one end thereof accurately sized for attachment to an electrical connecting means, said sheath constituting a low resistance path for the current from the point of attachment of the electrical connecting means to at least substantially the working end of the electrode.

7. An electrode for electrical arc heating apparatus, said electrode comprising a main body of siliconized silicon carbide and a metal sheath attached to the main body of the electrode and closely interfitting therewith, said sheath extending longitudinally of the electrode body for at least a substantial part of the length of the body whereby an electrical connecting means attached to the electrode substantially at one end thereof makes contact with such metal sheath, said sheath constituting a low resistance path for the current from the point of attachment of the electrical connecting means to at least substantially the working end of the electrode.

8. An electrode for electrical arc heating apparatus, said electrode comprising an elongated main body of siliconized silicon carbide and a sheath of appreciable thickness made of metal surrounding the main body of the electrode and closely interfitting therewith, said sheath extending longitudinally of the electrode body for at least a substantial part of the length of said body whereby an electrical connecting means attached to the electrode substantially at one end hereof makes contact with such metal sheath, said sheath constituting a low resistance path for the current from the point of attachment of the electrical connecting means to at least substantially the working end of the electrode.

9. An electrode for electrical arc heating apparatus comprising an elongated main body of siliconized silicon-carbide, said main body having an aperture longitudinally therethrough for the passage of gas, a sheath of appreciable thickness made of metal on said main body covering and tightly embracing the body for at least a substantial portion of its length, the sheath being so positioned as to allow direct electrical contact with the electrical connecting means for the electrode, said sheath constituting a low resistance path for the current from the electrical connecting means for the electrode to a point substantially at the working end of the electrode where the arc is formed.

10. In an electrical arc heating apparatus adapted for under-water use comprising means for holding an electrode and for making electrical connection to the electrode and means to supply electric current to the electrode holding means, the improved electrode which comprises a main body composed of siliconized silicon-carbide and a continuous sheath of strong material having a much lower electrical resistance than the main body closely interfitting with the main body of the electrode and extending longitudinally of the electrode body for at least a substantial part of the length thereof, said sheath being of appreciable thickness, said sheath directly contacting the electrical connecting means and constituting a low resistance path for the current from the electrical connecting means to at least substantially the working end of the electrode.

11. In an electrical arc heating apparatus adapted for under-water use comprising means for holding an electrode and for making electrical connection to the electrode and means to supply electric current to the electrode holding means, the improved electrode which comprises an elongated main body of siliconized silicon-carbide and a sheath of appreciable thickness made of metal surrounding the main body of the electrode and closely interfitting therewith, said sheath extending longitudinally of the electrode body for at least a substantial part of the length of said body, one end of said sheath directly contacting the electrical connecting means, said sheath constituting a low resistance path for the current from the point of attachment of the electrical connecting means to at least substantially the working end of the electrode.

12. In electrical arc cutting apparatus adapted for under-water use comprising means for holding an electrode and for making electrical connection to the electrode, means to supply electric current to the electrode holding means and means to supply oxygen under pressure to the electrode holding means, the improved electrode comprising an elongated main body of siliconized silicon-carbide and a sheath of appreciable thickness made of metal surrounding the main body of the electrode and closely interfitting therewith, the main body of the electrode having an opening longitudinally therethrough for the passage of oxygen to the arc, said metal sheath extending longitudinally of the electrode body for at least a substantial part of the length of the body, one end of said sheath accurately interfitting with the electrical connecting means whereby said sheath constitutes a low resistance path for the current from the point of attachment of the electrical connecting means to at least substantially the working end of the electrode.

13. An electrode for electrical arc cutting apparatus comprising a hollow cylindrical core of silicon-carbide, said core being annealed for reduction of stresses therein, a metallic sheath surrounding the main body of the electrode and a thermally insulating coating surrounding said sheath and covering substantially the entire length thereof.

BELA RONAY.

References Cited in the file of this patent
UNITED STATES PATENTS

| Number | Name | Date |
|---|---|---|
| 992,698 | Tone | May 16, 1911 |
| 1,200,810 | Clemens | Oct. 10, 1916 |
| 1,314,603 | Mott | Sept. 2, 1919 |
| 1,609,859 | Bond | Dec. 7, 1926 |
| 1,760,534 | Whiting et al. | May 27, 1930 |
| 1,871,257 | Cadwell | Aug. 9, 1932 |
| 1,880,545 | Waldman | Oct. 4, 1932 |
| 1,924,876 | Morgan | Aug. 29, 1933 |
| 1,980,229 | Sawhill et al. | Nov. 13, 1934 |
| 2,001,848 | Nyquist | May 21, 1935 |
| 2,010,605 | Miller | Aug. 6, 1935 |
| 2,077,397 | Christensen | Apr. 20, 1937 |
| 2,273,704 | Grisdale | Feb. 17, 1942 |

FOREIGN PATENTS

| Number | Country | Date |
|---|---|---|
| 246,565 | Great Britain | Jan. 28, 1926 |

OTHER REFERENCES

Ronay et al.: U. S. Navy developments in underwater cutting, reprinted from Journal of the American Society of Naval Engineers, vol. 57, #4, Nov. 1945, pp. 456–480.